July 1, 1952 C. M. CHORPENING ET AL 2,601,988

TRANSDUCER STYLUS AND HOLDER

Filed Aug. 8, 1946

INVENTORS.
CREED M. CHORPENING
LESTER E. HADLOCK

BY Francis J. Klempay

ATTORNEY.

Patented July 1, 1952

2,601,988

UNITED STATES PATENT OFFICE 2,601,988

TRANSDUCER STYLUS AND HOLDER

Creed M. Chorpening, Conneaut, and Lester E. Hadlock, Kingsville, Ohio, assignors to The Astatic Corporation, Conneaut, Ohio, a corporation of Ohio Application August 8, 1946, Serial No. 689,104

10 Claims. (Cl. 274—37)

This invention relates to the art of transcribing sound impulses from the surface grooves of record tablets by the use of electro-mechanical transducers, piezo-electric apparatus for example, and has to do more particularly with impulse gathering styli which are employed as driving means for such transducers.

Record transcribing styli of the so-called "semi-permanent" type have enjoyed great popularity in recent years due to their prolonged period of usefulness and many makers of transducer equipment have designed their products in such manner that the stylus is attached to the transducer in a truly permanent manner. Thus, it is often necessary to replace the entire transducer unit upon the stylus tip becoming worn or damaged. Since the use of such permanent stylus attaching means has permitted the inclusion of certain desirable operational features as reduced mass and inertia, for example, their use has persisted despite their apparent economic shortcomings.

Another type of stylus attaching means in current use is the conventional chuck and set-screw type wherein a replaceable stylus is secured to the transducer by the use of a manually operated screw. Although this latter type of attaching means facilitates the changing of a worn stylus it necessitates the interposition of an excessive and objectionable bulk of material between the stylus and the associated transducer apparatus which bulk tends to resist the free transmission of record vibrations.

It is accordingly a prime object of the present invention to provide novel economical and efficient means for detachably securing a record engaging stylus to a transducer unit in such manner that the advantages of both of the above described attaching means shall be embodied in a single device.

As is well known in the art, it is of extreme importance that a record engaging stylus possess a controlled degree of flexibility in each of two planes, the first laterally, in a direction parallel to the surface of the associated record disk for the purposes of reducing record wear and "needle talk," and the second vertically, in a plane normal to the surface of the record disk for the purposes of proper tracking and noise reduction. Such biplanar flexibility or compliance character is incorporated in the article of the present invention in a novel manner, hereinafter to be more fully described, and our device exhibits an optimum operating pattern as respects frequency response, uniform tracking in the record groove and minimum tip and record wear.

We have discovered also that considerable economy in the production of styli and styli holders may be effected by fabricating the several component parts in quantity upon automatic machines such as punch presses and screw machines for example. It will be noted that the several embodiments of the principles of our invention take full advantage of the versatility of such modern machinery.

In addition to the above stated object of providing novel securing means for record engaging styli we have in view the further object of affording means to render our securing device receptive to the installation of styli having diverse operational characteristics.

A further object of the invention is the provision of various forms of styli possessing different operating properties but each possessing the advantageous characteristics explained above.

Yet another object of the invention is the provision of improved forms of styli bodies adaptable to receive and secure record engaging wearing tips made of various substances, as either metal or jewel, for example.

A still further object of the invention is the provision of stylus forms capable of being fabricated of flat sheet metal strip or ribbon by simple stamping and bending operations.

And yet another object of the invention is the provision of stylus holders which may be suitably formed from low priced bar stock rather than from more expensive die cast or machined components.

These and other objects and advantages of the invention will be apparent upon consideration of the following detailed specification and the accompanying drawing wherein there are disclosed several preferred embodiments of the invention. These embodiments should be considered as illustrative only as obviously many changes may be made therein without departing from the spirit or scope of the invention.

Figures 1, 2, 3, 4, 5, 6, 7, 8, 9, 10, 11, 12, 13:
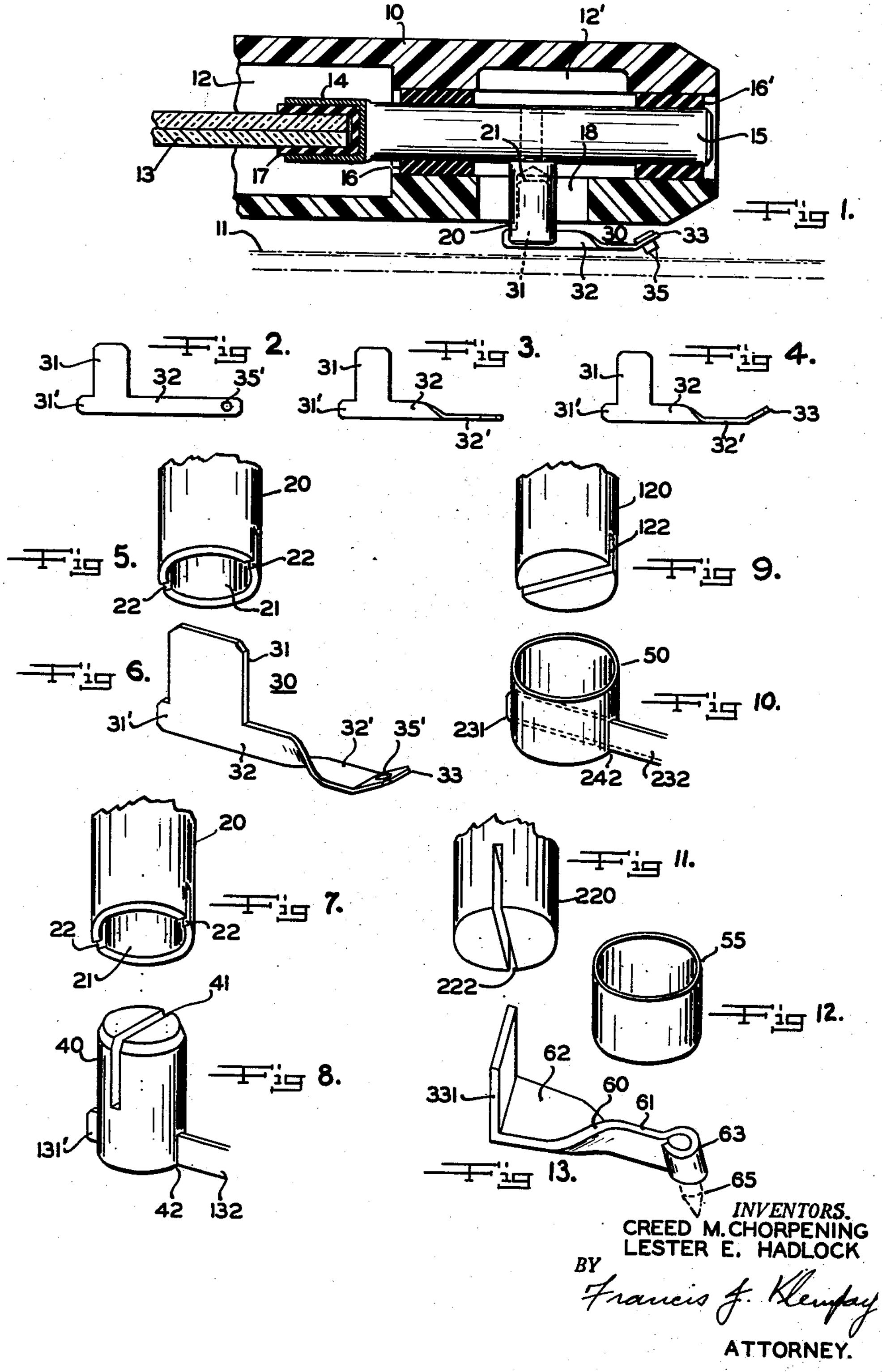
Figure 1 is a sectional view of an electro-mechanical transducer unit having associated therewith a stylus and stylus-holder constructed in accordance with the principles of the present invention.
Figures 2, 3 and 4 are side views of the body portion of the stylus of Figure 1 at progressive steps in its fabrication.
Figure 5 is a perspective view of a portion of the stylus holder of Figure 1.
Figure 6 is a perspective view of the stylus of Figures 1 through 4.
Figure 7 is a perspective view of the lower end of a modified form of stylus holder designed to secure the stylus of Figure 8.
Figure 8 illustrates a modified form of a separable stylus adapted to be received in the holder of Figure 5 or Figure 7.
Figure 9 illustrates a modification of the holder of Figure 5 designed to receive and secure the stylus of Figure 10.
Figure 10 shows a modified form of stylus adapted to be received in holders of either Figures 5, 7, or 9.
Figure 11 is a perspective view of a further modified form of holder for the reception of the stylus of Figure 13.
Figure 12 shows a retention band intended to encircle the holder of Figure 11.
Figure 13 illustrates a modified form of stylus adapted to be secured in the holder of Figure 11 by the band of Figure 12.

Referring now to the drawing more in detail, the reference character 10 designates the case or housing of an electro-mechanical transducer unit which is supported in any well known manner and which is normally mounted to swing both laterally and vertically with respect to the record disk 11. Suitable cavities 12 and 12′ within the case 10 contain the various active parts of the assembly including a piezo-electric crystal 13, a crystal yoke 14 and a drive rod 15. Surrounding rod 15 and journaling it for limited rotation are provided the rubber bearings 16 and 16′ and interposed between the inner surfaces of yoke 14 and the outer surfaces of crystal 13 is a rubber damping pad 17 to control the quality and/or magnitude of the vibrations being transmitted from the former to the latter. The physical properties of the several rubber members 16, 16′ and 17 are preferably such that the desired degree of sensitivity is incorporated in the transducer assembly, as is well known in the art.

A vertically disposed stylus holder 20 is rigidly secured to drive rod 15 and depends therefrom through a window 18 formed in the lower surface of case 10. Ample clearance is provided for the free movement of holder 20 within window 18. In the views of Figures 1, 5 and 7, the holder 20 is illustrated as having a hole 21 counterbored in its lower end which leaves the remaining metal in the form of a tube. Slots 22 are milled in the walls of holder 20 at diametrically opposed points and during assembly of holder 20 and rod 15 slots 22 will be aligned with the longitudinal axis of rod 15. The effect of eliminating the counterboring of holder 20 may be observed in the modification of Figure 9 wherein the holder 120 is a solid rod while the slot 122 is continuous across the diameter of the holder.

We provide, for insertion into the lower end of rod 20, a formed metal stylus 30 having a vertically disposed key portion 31, a forwardly extending arm portion 32, an upturned forward end 33 and adapted to have attached at its forward end a record engaging tip 35.

In accomplishing one of the objects set forth above we have devised a novel process for producing the stylus 30, the several steps in this process being illustrated in Figures 2, 3 and 4. We first produce a flat metal blank as shown in Figure 2, by stamping the same from suitable sheet material, as beryllium-bronze, for example. The key portions 31 and 31′, the arm 32 and the hole 35′ are all formed at this time in a single operation. Next we deform arm 32 near its mid point, as shown in Figure 3, by rotating its forward end through an angle of 90° to produce the horizontally disposed portion 32′. The extreme forward end is then turned upwardly at an angle of approximately 26° as shown at 33 in Figure 4. A suitable record engaging tip may now be inserted in hole 35′ and secured therein to complete the first embodiment of the stylus of the invention.

By accurately controlling the cutting of the key 31, we are able to produce a stylus of finished dimension which will readily be secured within the counterbore 21 of holder 20 by simple frictional retention. Since it is essential that the mass of holder 20 be kept to a minimum it will be understood that the tubular walls thereof will be relatively thin and will exhibit some tendency to deform thus tending to grip the edges of key 31 upon its insertion. Key 31′ and a small portion of arm 32 will coact with slots 22 to keep the entire stylus aligned with holder 20.

The peculiar bent form of the stylus arm 32 imparts the required characteristic of biplanar flexibility to the device of the invention and causes it to exhibit extremely desirable degrees of both vertical and horizontal compliance in its operation. It will be noted that the choice of such materials as beryllium-copper, phosphorus-bronze or spring brass expedites the attachment of record engaging tip 35 by means of soldering, for example, while also exhibiting optimum characteristics of flexibility and vibration transmission.

The preferred embodiment, described thus far, may be modified in many respects, several of which are disclosed in the remaining figures of the drawing.

In Figure 7 is illustrated a holder 20 which is similar to that of Figures 1 and 5. For insertion into this latter form of holder we provide the stylus of Figure 8 having a vertically disposed column 40 in place of the key 31 referred to above. A transverse slot 41 is formed in the upper end of column 40 to permit it to exhibit a slight degree of flexibility and thus to cause it to securely retain itself within the counterbore 21. Column 40 may be advantageously fabricated in any automatic screw machine. An arm member 132, made of flat strip material, is secured to the lower end of column 40 and is retained in a laterally disposed slot 42 formed therein. Arm 132 is permitted to extend a slight distance rearwardly of column 40 to form a key 131′ which will coact with one of the slots 22 to align members 40 and 20. The forward end of arm 131 may be formed in the manner of the arm 32 described above. While the use of the stylus of Figure 8 entails the inclusion of a greater mass of material it will assure more secure connection between stylus and holder as may be desirable in some applications.

In the modification of Figure 9 there is illustrated a stylus holder 120 formed from solid rod stock and having a laterally disposed slot 122 placed across its lower end. For use with this modified holder the stylus of Figure 10 is provided wherein the stylus arm 232 is secured within a slot 242 formed in the lower edge of a ferrule 50. Ferrule 50 is of such internal diameter that it snugly fits over holder 120 and may be attached or removed with ease to facilitate replacement of worn or damaged styli. Arm 232 extends diametrically across ferrule 50 and a slight key 231 is allowed to protrude at the rearward end. In a state of assembly with the holder 120 that portion of arm 232 lying within the walls of ferrule 50 serves as an aligning bar when inserted within slot 122. If ferrule 50 be of correct internal diameter and if the thickness of arm 232 be the same as that of arms 32 or 132, mentioned above, the stylus of Figure 10 will obviously be operable upon any of the holders of Figures 5, 7 or 9. It will be understood that the forward end of arm 232, not shown, may be formed in a manner similar to that shown in Figures 1 and 6.

A still further modification of the holder and stylus of the present invention is illustrated in Figures 11 and 13 and attention is directed first to the former wherein the holder 220, made of solid rod stock, replaces the counterbored holder 20 of Figure 1. A transverse slot 222 receives and aligns a suitable key on the associated stylus. The stylus of this modification is formed in a manner somewhat similar to those already described in that it comprises a twisted transition 60 between a vertically disposed forward portion 61 and a horizontally disposed rearward portion 62. Forward portion 61 is bent to form an eye 63 encircling the body of a record engaging tip 65 which may be held in place with solder or cement as is well known in the art. At the rearward end of the horizontal portion 62 a vertically disposed key 331 is formed to be inserted into slot 222 of the holder 220 to align the respective stylus and holder and to frictionally retain the former in the latter. A separate sleeve or ferrule 55 is provided to be slipped over holder 220 to prevent any longitudinal motion of key 331 within slot 222. Ferrule 55 and key 331 may be so proportioned that the key has tight engagement in the ferrule while the ferrule has tight engagement over the holder 220. It will be apparent that in the present modification the mutual relation of the oppositely disposed portions 62 and 61 has been reversed from the relation of parts 32 and 32′ shown in Figure 6. This reversal does not impair the operation of the stylus of Figure 13 since there is still included a flat portion 62 responsive to vertical undulations and a vertical portion 61 responsive to horizontal undulations of the associated record engaging tip.

It should now be apparent that we have provided new and improved stylus holders, styli, and methods of fabricating the same which accomplish, in a novel manner, the objects initially set out. The several styli of the disclosure may be readily fabricated of flat strip material simply by punching and bending, the various holders may be automatically produced in a screw machine or automatic lathe. Interchanging of the several holders and styli is permitted and in each case a stylus assembly results which displays excellent operational characteristics. As these various modifications are intended to be illustrative only, reference should be had to the appended claims in determining the scope of the present invention.

What we claim is:

1. In a phonograph pick-up the combination of a vertically disposed tubular member constituting a stylus holding member and having a diametrically disposed slot in its side wall lower end extending upwardly from the bottom end thereof, and a stylus mounting member comprising a plug receivable in said tubular member and having a diametrically disposed slot in its bottom end portion, and a horizontal reach of a vertically oriented strip rigidly secured in said last mentioned slot and adapted to be received in said first mentioned slot upon application of said stylus mounting member to said holding member.

2. In a phonograph pick-up having a drive rod mounted for rocking movement about its longitudinal axis the combination of a tubular socket member rigidly secured at one end to said drive rod and extending downwardly and radially outward of said axis, said tubular socket having a slot in its side wall extending upwardly from its lower end, and a stylus assembly having a plug-like mounting member frictionally received in said socket and having a vertically disposed tab receivable in said slot whereby said stylus assembly will be retained by said socket in a predetermined angular relation with respect to the axis of said drive rod.

3. A stylus for a phonograph pick-up comprising in combination a plug-like member adapted to be frictionally received in a tubular stylus holder, an elongated arm rigidly secured at one end to an end of said plug member and extending radially outward of the longitudinal axis of said plug member and mounting at its outer free end a record groove engaging tip, said arm having a predetermined degree of compliance to bending in vertical and horizontal planes, and tab means rigidly secured to said plug member and extending radially outward therefrom and adapted to be received in a slot formed in the side wall of said tubular holder whereby said plug member is maintained in predetermined orientation with respect to the tubular holder.

4. A phonograph pick-up assembly comprising in combination a stylus mounting member, a stylus holding member, said members being adapted for telescopic interconnection whereby the principal axes of said members are rigidly maintained substantially coincident, an elongated arm rigidly secured to an end of said mounting member and mounting at its outer free end a record groove engaging tip, said arm having predetermined degrees of compliance to bending movement in horizontal and vertical planes, and tab means on one of said members and a cooperating slot on the other of said members whereby upon telescopic application of said mounting member to said holding member said arm is restrained against rotation about the common axes of said members.

5. Apparatus according to claim 4 further characterized by said elongated arm and said stylus mounting member being integrally formed of sheet metal, said arm comprising a vertically oriented flat portion and a horizontally oriented flat portion, said last mentioned portion being adapted to carry a record groove engaging tip, and said stylus mounting member comprising a key portion extending vertically from said vertically oriented portion, said key portion being adapted for telescopic frictional interconnection with said stylus holder.

6. Apparatus according to claim 4 further characterized by said stylus holding member having a tubular lower end extremity; said elongated arm and said stylus mounting member being integrally formed of sheet metal; said arm comprising a vertically oriented flat portion, a torsional deformation, and a horizontally oriented flat portion adapted to carry a record groove engaging tip; and said stylus mounting member comprising a vertically extending key portion adapted for telescopic frictional interconnection with said tubular lower end extremity.

7. Apparatus according to claim 4 further characterized by said stylus holding member comprising a tubular member disposed vertically and having diametrically opposed slots in its side wall extending upwardly from its lower end, said stylus mounting member and said elongated arm being integrally formed, said stylus mounting member comprising an upwardly projecting key portion adapted for telescopic frictional interconnection with said tubular member, and said arm having vertically oriented portions receivable in said slots.

8. Apparatus according to claim 4 further characterized by said stylus holding member being vertically disposed and having a transverse slot extending upwardly from its lower end extremity, said elongated arm having a vertically oriented reach adapted for reception in said slot, and said stylus mounting member comprising a band rigidly secured to said arm and adapted for telescopic frictional interconnection with the lower end of said stylus holding member.

9. Apparatus according to claim 4 further characterized by said stylus holding member being vertically disposed and having a transverse slot in its bottom end portion extending upwardly from the bottom wall thereof, said stylus mounting member and said arm being integrally formed, said stylus mounting member comprising a flat vertically extending key portion adapted for telescopic frictional interconnection with said slot, said stylus holding member including a separable ferrule member for enclosing the transverse ends of said slot.

10. Apparatus according to claim 4 further characterized by said stylus holding member comprising a plug member, said stylus mounting member comprising a ferrule member adapted for telescopic frictional interconnection with said plug member, said arm being rigidly secured to said ferrule member.

CREED M. CHORPENING.
LESTER E. HADLOCK.

REFERENCES CITED

The following references are of record in the file of this patent:

UNITED STATES PATENTS

| Number | Name | Date |
|---|---|---|
| 2,177,239 | Bird | Oct. 24, 1939 |
| 2,326,424 | Andres | Aug. 10, 1943 |
| 2,326,460 | Hasbrouck | Aug. 10, 1943 |
| 2,426,061 | Snepvangers | Aug. 19, 1947 |
| 2,432,444 | Roberts | Dec. 9, 1947 |
| 2,455,913 | Bauer | Dec. 14, 1948 |
| 2,511,663 | Bachman | June 13, 1950 |
| 2,511,664 | Bachman | June 13, 1950 |

FOREIGN PATENTS

| Number | Country | Date |
|---|---|---|
| 357,698 | Great Britain | Oct. 1, 1931 |